July 2, 1929.  H. J. MURRAY  1,719,778
UNIVERSAL SWITCH MOUNTING
Filed May 29, 1924  2 Sheets-Sheet 1
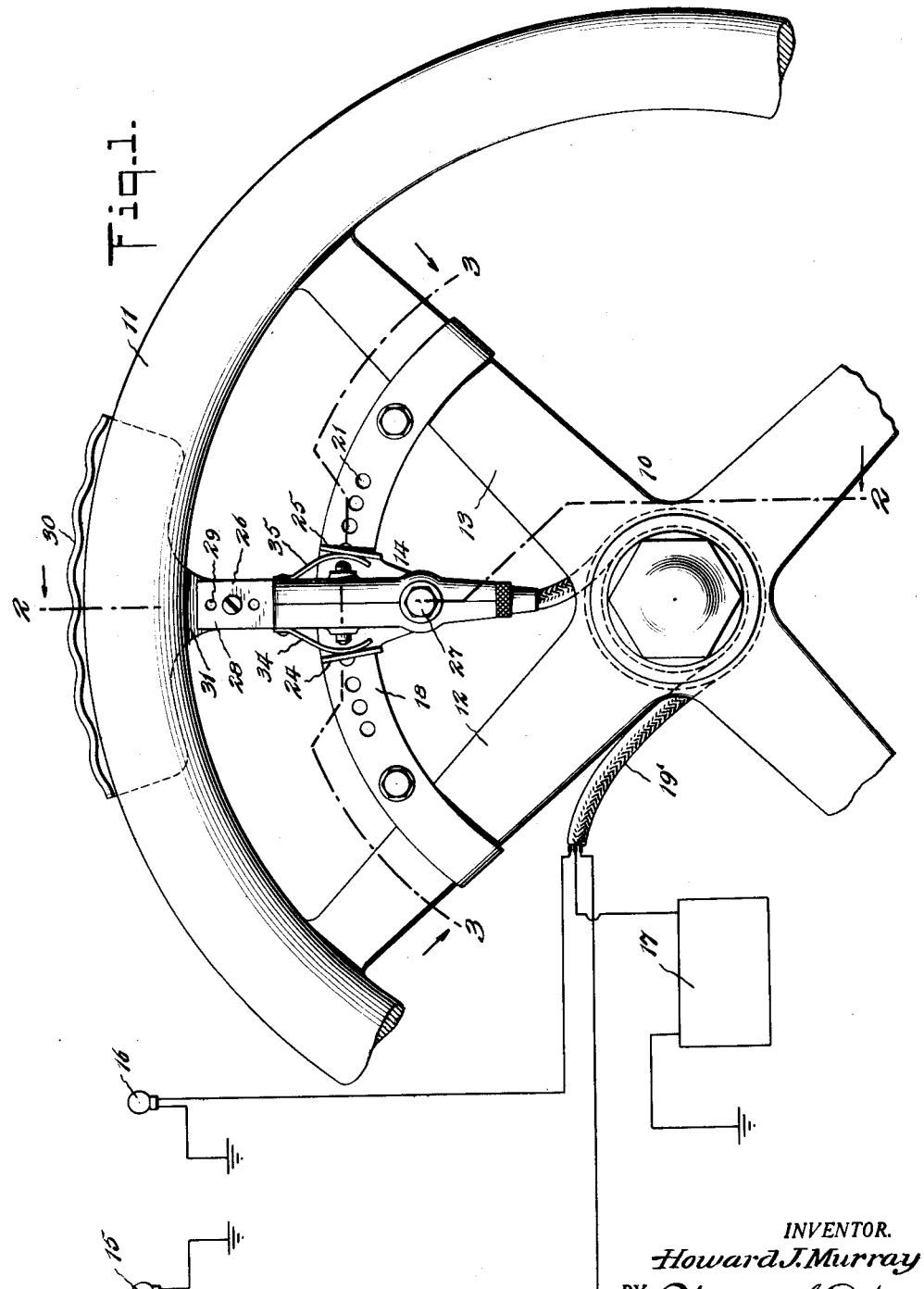
INVENTOR.
Howard J. Murray
BY Warren S. Orton
ATTORNEYS.

July 2, 1929.  H. J. MURRAY  1,719,778
UNIVERSAL SWITCH MOUNTING
Filed May 29, 1924  2 Sheets-Sheet 2
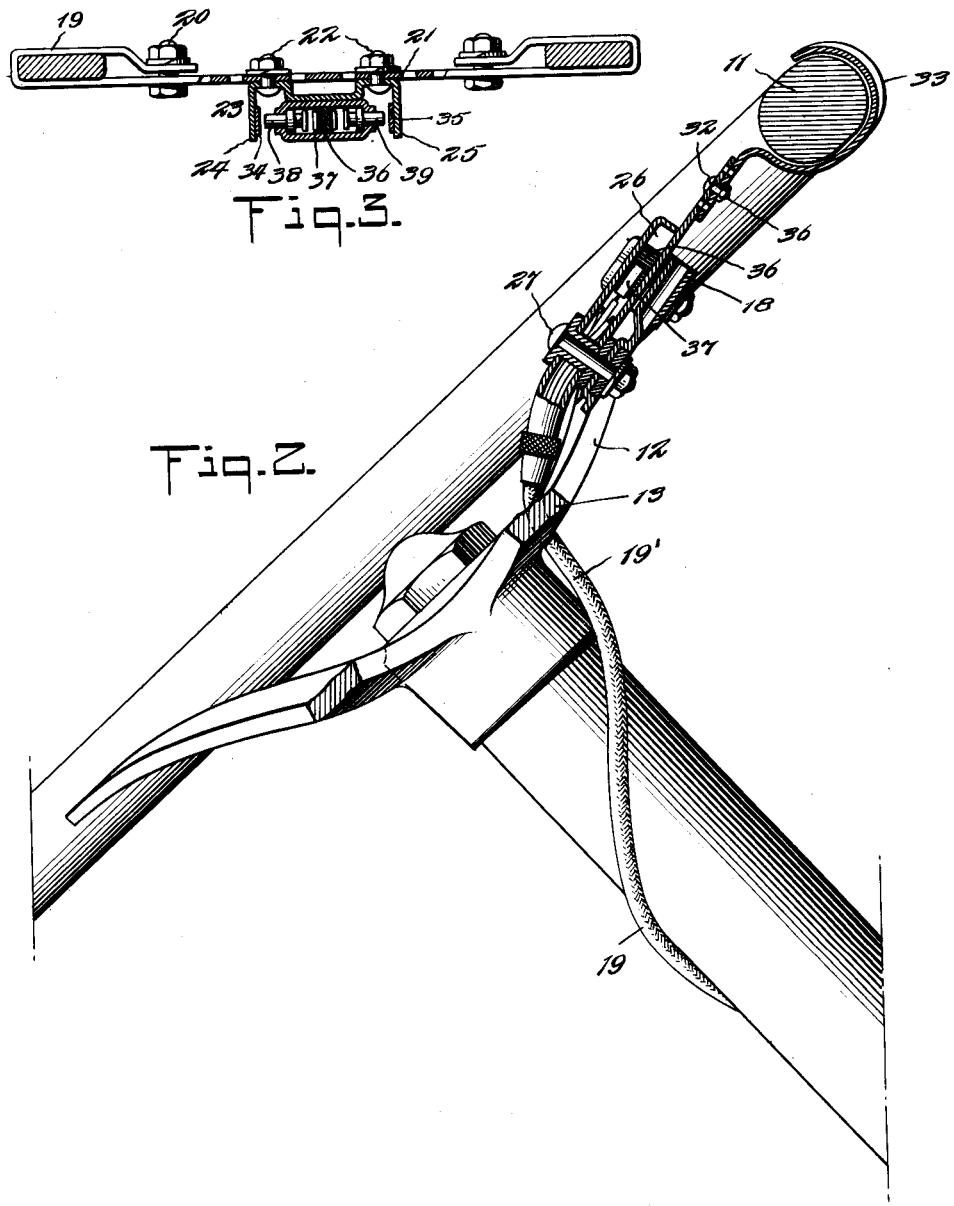
INVENTOR.
Howard J. Murray
BY
Warren S Orton
ATTORNEYS.

Patented July 2, 1929.

1,719,778

UNITED STATES PATENT OFFICE.

HOWARD J. MURRAY, OF NEW YORK, N. Y., ASSIGNOR TO R. M. COMPANY, INC., OF EAST PITTSBURGH, PENNSYLVANIA, A CORPORATION OF DELAWARE.

UNIVERSAL SWITCH MOUNTING.

Application filed May 29, 1924. Serial No. 716,581.

The invention relates in general to a control device for use in connection with the steering mechanism of an automotive vehicle and the invention specifically relates to an electric circuit closer or control switch constituting part of a signalling device of the type commonly found on automotive vehicles and used for the purpose of selectively indicating signals for different purposes, such for instance as a signal for indicating the intent of the operator to turn to the right or left.

The invention herein disclosed constitutes one of a series of copending applications, to wit: Serial No. 634,625, April 25, 1923; Serial No. 650,010, July 7, 1923; Serial No. 650,011, July 7, 1923; Serial No. 658,831, Dec. 6, 1923; Serial No. 680,247, Dec. 13, 1923; and constitutes a later development of certain of the features disclosed in some of these prior applications.

In the physical embodiment of the invention disclosed in the first filed of the above identified applications the control switch and the handle for actuating the same was illustrated as being fitted into the rim of the steering wheel and which, of course, necessitated a cutting away of part of the rim in order to mount the switch in place. In the second and third applications the switch was mounted on the steering column and controlled by means of a handle which extended therefrom to the rim; in the fourth application the control switch was mounted on one of the spokes and in the last of the previously filed applications the control switch was of a compound type in part mounted on the steering column and in part on an attachment secured to the rim without necessity of mutilating any part of the steering wheel.

It is readily appreciated that the several constructions disclosed in these prior applications are open to certain objections to their adoption universally to different types of steering wheels. For instance, in the construction disclosed in the first application it is necessary to cut away a portion of the rim in order to mount the mechanism. In connection with the other disclosures where the switches are designed as attachments, the differences in size and configuration of the steering columns and steering wheels of different makes of automotive vehicles would necessitate modifications of the forms of attachments sold with the device in order to fit the same to the different sizes and configurations of steering wheels and columns now in general use.

The present disclosure corresponds to the devices in the above identified applications in that there is provided a control by means of which the operator can indicate, and even pre-indicate, his intent to turn either to the right or to the left and which control may be operated as a positive overt act on the part of the operator or may be operated inciuental to the movement of the operator's hand in effecting a steering operation and without necessity of conscious effort on the part of the operator to actuate the proper signal.

The primary objects of the present disclosure is to provide a single form of control of the type indicated, which can be marketed complete as an article of manufacture, which is particularly designed for universal application upon all standard forms of vehicle steering wheels and which can be mounted in place by the unskilled person and without necessity and use of any tools except a bolt wrench.

An examination of the different automotive vehicle steering wheels now in general use disclose wide differences in configuration and dimension. The hubs are of different sizes; the external diameters differ and the cross-sections of both the rim and spokes differ. The one feature which appears to be common to all of the wheels is that they are provided with four spokes, extending radially and positioned approximately 90° apart and with an available space between adjacent spokes capable of receiving a switch device of the character herein disclosed.

Accordingly, the invention features a mounting for a control switch designed to suspend the switch in the available space between adjacent spokes and secured to the spokes.

In the preceding applications it has been pointed out that there was an advantage in positioning the control handle to such a switch at the top of the control wheel or at the point furthest removed from the operator. Due to wear on the worm of the steering column and to other causes which effect the position of the steering wheel this furthest point of the steering wheel changes as the parts become worn.

The present disclosure features a construction by means of which the position of the switch and its control handle may be adjusted whenever necessary to centralize the position of the control handle should such adjustment be desired either in the initial mounting of the device or later.

Another object of the invention and featuring economy in cost is to provide a construction which can be easily formed of sheet metal stampings substantially free of machining or refined operation and fabricated without necessity of using skilled labor.

Another object of the invention is to provide a simplified device of the type outlined in which the several adjustable parts, the cable securing means, the balancing springs, the electrical contacts and electrical conductors are all easily accessible for inspection and repair.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a plan view looking down on the upper portion of an automotive vehicle steering wheel showing the pair of upwardly extending spokes and adjacent parts of the rim, with a preferred embodiment of the invention secured to the spokes and also showing diagrammatically a signalling device with the necessary electrical connections.

Figures 2 and 3 are each vertical, transverse sectional views taken respectively on the lines 2—2 and line 3—3 of Figure 1 looking in the direction indicated by the arrows.

In the drawings there is shown part of a steering wheel 10 which includes the usual rim portion 11 designed to be grasped in the act of steering the vehicle. There is also shown two of the usual four spokes and particular reference will be made hereinafter to the two upwardly or forwardly extending spokes 12 and 13. In all respects it is to be assumed that the showing of the vehicle wheel is intended to represent the standard form of four spoke steering wheels now in general use.

It will be further assumed that the vehicle is provided with some suitable form of direction indicator herein shown to be of an electrically actuated type and controlled selectively by a two-way circuit closer 14. There is also shown diagrammatically in the drawings a left indicating signal 15, a right indicating signal 16 supplied from one side of the source of electric energy 17, the other side of which source is grounded on the machine following conventional practice.

Referring specifically to the controlling circuit closer 14 for the indicator it is intended that the same shall be marketed as a complete unit including the switch 14, its mounting bracket 18 and the connecting cable 19 leading from the switch and containing the necessary electric conductors.

The bracket 18 is a flat, metal strip in the form of a segment, 90° of arc, between centers as shown on Fig. 1, with opposite ends lapped back upon itself as shown in Fig. 3 to form straps 19' for encircling the spokes. The straps are each fastened in clutching engagement with its associated spoke by means of a nut 20. The central portion of the bracket is provided with a line of bolt holes 21 and adjustably mounted on the bracket is the switch 14 secured in place by means of bolts 22 passing through selected pairs of the holes 21 to bring the switch handle, hereinafter described, into the desired position relative to the rim.

The switch comprises a plate 23 T-shaped in plan as shown in Fig. 1 and hereinafter referred to as an adjustable switch support. This support is fixed in its adjusted position on the bracket by means of the bolts 22 which pass through spaced apart bolt holes therein as shown in Figure 3. By means of this construction the support and with it the entire switch may be secured in several adjusted positions along the arc length of the bracket. Opposite sides of the support 23 above the bracket are upturned to provide a pair of circumferentially spaced apart walls 24 and 25 which act as stops or abutments for the balancing springs hereinafter described. The support 23 is provided with a reduced extension which projects from the bracket towards the hub of the wheel. A combined switch arm and switch casing 26 is pivotally mounted to this extension by means of a pivoting bolt 27. The major portion of the switch arm is a hollow tube and extends in opposite direction from its pivotal mounting. The switch arm extends outwardly of the bracket and its forward end is flat to provide a flange 28 having a series of bolt holes 29 extending therethrough. The switch arm is controlled by means of a switch handle 30 which forms an adjustable extension from the arm. The handle is somewhat T-shaped in plan with the stem portion 31 secured to the flat flange 30 by means of small bolts 32 passing therethrough and through the arm holes 29. The head portion of the handle is preferably formed of spring metal of a cross-section curvature, as shown in Figure 2, to underlap and extend upwardly upon the periphery or front side of the rim. The handle when viewed in plan as shown in Fig. 1 conforms substantially to the curvature of the rim, and preferably has its outer face corrugated as shown at 33 in order to provide an easily engaged hand grip. The adjustment provided by the bolt and bolt holes 29 and 32 permits the setting of the handle so as to be close to the rim and at the same time free to slide about the periphery of the rim for the short distance in each direction from its normal position sufficient to actuate the contacts of the circuit closer. The arm is maintained centered between the stops 24 and 25 and in position with the circuit closer in its normal, inoperative position by means of a pair of oppositely disposed balancing springs 34 and 35 secured to the outer side of the switch arm and bearing respectively against the walls 24 and 25. The switch is of a two-way type; is contained within the tubular body portion of the switch arm and is controlled selectively by the direction of turning of the switch arm. The switch illustrated includes a centrally positioned insulating plug 36 opposite sides of which are provided with contacts 37 connected electrically to the source of energy 17. The switch arm is provided on opposite sides with a pair of movable contacts 38 and 39 which extend in opposite directions through the sides of the casing, one of which is connected electrically to the left indicating signal 15 and the other to the right indicating signal 16 by means of the conductors contained in the cable 19.

It will be understood that the shifting of the handle 30 in either direction from the normal position shown in the drawings will close one or the other circuit including the signals, depending upon the direction of the throw of the handle. For instance, a movement of the handle to the right from the position shown will cause the casing to swing about its axis at the bolt 27. The initial part of this movement and until the right contact 38 engages the right spring 34 will be an idling movement and the circuits will remain open: a further movement of the lever will cause the outer end of the right contact to bear on the spring which is held by the right stop 25 and react to close the circuit through the contact 37 and through the right signal 16 to cause the same to function. Releasing pressure on the handle will permit the balancing springs automatically to return the switch arm to its natural position, thus automatically intercepting the current flow through the previously closed circuit.

The device disclosed can be readily inserted in position on the vehicle by removing the switch handle and removing the strap fastening bolts 20. The segment bracket is positioned with the ends bent loosely around the spokes 12 and 13. The bracket is then moved radially away from the hub and until the straps bind snugly against the angularly disposed spokes. The bolts 20 are then inserted in place and tightened thus securely fastening the bracket in position on the spokes. The nuts 22 are then loosened if necessary to reset the support 23 and the support is shifted longitudinally on the bracket until the arm is in the desired position and preferably in a position extending radially away from the operator. The handle is then sprung on the rim and secured in its located position by means of the nut 32. When the necessary electric connection has been made to the source of electric supply and to the signals or other mechanism controlled by the switch the device is ready for operation.

The device disclosed is complete with all necessary wiring and it is simply necessary for the operator to mount the device on the wheel in the manner hereinbefore suggested, coil the cable about the steering post and make the necessary electrical connections with the indicator mechanism already mounted on the car. This can be done with simple tools, does not require any mutilation of the car parts and does not interfere with other apparatus commonly found on such steering wheels.

The construction disclosed features simplicity in manufacture for the parts can all be made of simple stampings from sheet metal and refined machine operations and complicated fabricating operations have been practically eliminated.

The present disclosure features adaptability of the device to different forms of steering wheels so that the attachment can be applied universally to different makes of cars. The device can be conveniently contained in the available space between adjacent spokes without interfering with the control segments locking mechanism and other parts usually found on vehicle steering wheels. The necessary adjustment can be quickly and easily made and therefore but one size of device need be carried in stock by the dealer supplying the different makes of vehicles.

Having thus described my invention, I claim:

1. A circuit closer for use on a vehicle steering wheel including a segment bracket provided with wheel spoke clamping means and a switch member carried by the bracket, said switch member including a control handle constituting a hand grip fitted to and adapted to be moved along the rim of the wheel.

2. An attachment for installation on different types and sizes of vehicle steering wheels which include a steering rim and a pair of spokes extending approximately 90° to each other, said attachment including a support provided with means at opposite ends for securing the same to and suspended between the spokes and a control element carried by the support and including a handle constituting a hand grip adapted to be positioned at the rim of the wheel thereby to be disposed convenient to the hand of the operator while engaging the rim in the act of steering the vehicle.

3. In a device of the class described, the combination of a segment bracket provided at opposite ends with straps for securing the same to the spokes of a vehicle steering wheel, a switch support adjustable circumferentially on said bracket, means for securing the support in its adjusted position on the bracket, a switch arm pivoted to the casing, electric contacts contained in said arm and controlled by the movement thereof, a handle having a hand-gripping portion adapted to move about the rim of the steering wheel and having a securing portion adjustable on the control arm and means for securing said handle in its adjusted position on the arm.

4. In a device of the class described, the combination of a two-way electric control switch provided with a control handle including a grip member movable from a neutral position in one direction for closing one circuit and movable in the opposite direction therefrom for closing another circuit, and means for mounting the switch on the spokes of a vehicle steering wheel in position to bring the grip member of the handle at the rim of the wheel and in position to be movable for a short distance circumferentially about the same.

5. In a device of the class described, the combination of a switch support provided with means for securing the same in suspended position between the spokes of a vehicle steering wheel, an electric switch provided with a control handle mounted on said support and adapted to extend radially of the wheel, said handle having a hand-gripping portion substantially conforming to and adapted to be positioned at the outer periphery of the wheel rim.

6. A control for a direction indicator including a segmental strip with its ends forming strips for encircling the spokes for a vehicle steering wheel, said strip provided with a line of bolt holes, a switch including a T-shaped support, means passing through one of the holes in the strip for securing the support in adjusted position on the strip, said support provided with a pair of circumferentially spaced stops, a combined switch arm and switch casing pivotally mounted on the support, a handle for swinging the arm, a pair of oppositely disposed balancing springs secured to the switch arm and bearing on the stops and a two-way switch contained within the arm and controlled selectively by the direction of turning of the switch arm.

Signed at New York city, in the county of New York and State of New York, this 21st day of May A. D. 1924.

HOWARD J. MURRAY.